United States Patent
Sasakawa et al.

(10) Patent No.: US 10,694,748 B2
(45) Date of Patent: Jun. 30, 2020

(54) 1-AMINO-1-CYCLOPROPANECARBOXYLIC ACID HYDROCHLORIDE FORMULATIONS

(71) Applicant: Valent BioSciences LLC, Libertyville, IL (US)

(72) Inventors: Mitsuhiro Sasakawa, Tokyo (JP); Parvesh Sharma, Buffalo Grove, IL (US); Bala N. Devisetty, Buffalo Grove, IL (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 0 days.

(21) Appl. No.: 15/940,324

(22) Filed: Mar. 29, 2018

(65) Prior Publication Data

US 2018/0279621 A1    Oct. 4, 2018

Related U.S. Application Data

(60) Provisional application No. 62/479,524, filed on Mar. 31, 2017.

(51) Int. Cl.
*A01N 53/00*  (2006.01)
*A01N 25/02*  (2006.01)
*A01N 25/30*  (2006.01)
*A01N 37/42*  (2006.01)

(52) U.S. Cl.
CPC ............. *A01N 53/00* (2013.01); *A01N 25/02* (2013.01); *A01N 25/30* (2013.01); *A01N 37/42* (2013.01)

(58) Field of Classification Search
CPC ........ A01N 37/42; A01N 25/02; A01N 53/00; A01N 25/30
See application file for complete search history.

(56) References Cited

U.S. PATENT DOCUMENTS

| | | | |
|---|---|---|---|
| 4,367,344 A * | 1/1983 | Gallenkamp | A01N 53/00 504/171 |
| 4,452,625 A | 6/1984 | Lürssen et al. | |
| 6,361,783 B2 * | 3/2002 | Moaddel | A61K 8/06 424/401 |
| 9,040,460 B2 | 5/2015 | Venburg et al. | |
| 9,808,004 B2 * | 11/2017 | Venburg | A01N 37/42 |
| 2009/0011939 A1 | 1/2009 | Thrower et al. | |
| 2010/0267557 A1 | 10/2010 | Silverman et al. | |
| 2010/0317529 A1 | 12/2010 | Silverman et al. | |
| 2016/0198714 A1 * | 7/2016 | Stoller | A01N 25/02 504/136 |
| 2018/0279622 A1 * | 10/2018 | Sharma | A01N 25/02 |

OTHER PUBLICATIONS

International Search Report and Written Opinion dated Aug. 8, 2018.
Colomera et al. 'Biotechnological washing of denim jeans', ScienceDirect Topics, 2015, pp. 1- 2 (retrieved on May 30, 2018 from https://lwww.sciencedirect.com/topics/chemistry/ethoxylation); p. 1.
Apelbaum et al. 'Some Characteristics of the System Converting 1-Aminocyclopropane-1- carboxylic Acid to Ethylene', Plant Physiology, Jan. 1981, vol. 67, pp. 80-84; p. 82.

* cited by examiner

*Primary Examiner* — Mina Haghighatian
(74) *Attorney, Agent, or Firm* — Wood, Phillips, Katz, Clark & Mortimer

(57) ABSTRACT

The present invention relates to 1-amino-1-cyclopropanecarboxylic acid hydrochloride salt formulations and methods of their use.

3 Claims, No Drawings

1-AMINO-1-CYCLOPROPANECARBOXYLIC ACID HYDROCHLORIDE FORMULATIONS

FIELD OF THE INVENTION

The present invention relates to 1-amino-1-cyclopropanecarboxylic acid hydrochloride salt formulations and methods of their use.

BACKGROUND OF THE INVENTION 1-amino-1-cyclopropanecarboxylic acid ("ACC") is a product of the enzyme ACC synthase and acts as a precursor for the biosynthesis of ethylene in plants. Ethylene has been shown to be involved in several plant responses including stress, fruit set, leaf abscission and anthesis. Because of its role as an ethylene precursor ACC has been used in agriculture to induce ethylene responsive events.

In the laboratory, ACC has been converted to several forms including ACC hydrochloride. However, ACC hydrochloride is not stable in solution at a pH from 2.7 to 8.5 and thus must be stored as a solid. For particular agricultural uses, ACC hydrochloride must be dissolved in a liquid carrier before application. This extra step can lead to increased cost to the end user due to the time needed to prepare the liquid compositions and errors made during preparation by the end user. Thus, there is a need in the art for a stable liquid ACC hydrochloride formulation.

SUMMARY OF THE INVENTION

The present invention is directed to liquid agricultural formulations comprising 1-amino-1-cyclopropanecarboxylic acid hydrochloride salt ("ACC HCl salt").

Formulations of the present invention may be aqueous or non-aqueous.

Formulations of the present invention may further comprise a surfactant.

DETAILED DESCRIPTION OF THE INVENTION

In one embodiment, the present invention is directed to a liquid agricultural formulation comprising ACC HCl salt and water, wherein the formulation has a pH from 2.75±0.3 to 8.5±0.3.

In another embodiment, the ACC HCl salt is at a concentration from about 1% to about 50% w/w, preferably from about 5% to about 20% w/w.

In another embodiment, aqueous formulations of the present invention further comprise a surfactant, preferably polyoxyethylene alkyl ether phosphate, more preferably polyoxyethylene alkyl ether phosphate with a degree of ethoxylation of 5 to 6 moles.

In another embodiment, aqueous formulations of the present invention further comprise ethylenediaminetetraacetic acid ("EDTA").

In another embodiment, the present invention is directed to a liquid agricultural formulation comprising ACC HCl salt and a non-aqueous solvent.

In another embodiment, the non-aqueous solvent is propylene glycol.

In another embodiment, non-aqueous formulations of the present invention further comprise a surfactant, preferably polysorbate 20.

In a preferred embodiment, the present invention is directed to aqueous agricultural formulation comprising:

about 5% to about 20% w/w ACC HCl salt, preferably about 13.6% w/w;

about 1% to about 5% w/w polyoxyethylene alkyl ether phosphate with a degree of ethoxylation of 5 to 6 moles, preferably about 2.5% w/w;

about 0.1% to about 1.5% w/w EDTA, preferably about 0.5% w/w; and water, wherein the formulation has a pH from 2.75±0.3 to 8.5±0.3, preferably from 4.0±0.3 to 8.0±0.3.

In a preferred embodiment, the present invention is directed to non-aqueous agricultural formulation comprising:

about 5% to about 20% w/w ACC HCl salt, preferably about 13.6% w/w;

about 60% to about 90% propylene glycol, preferably about 84% w/w; and about 1% to about 5% w/w polysorbate 20, preferably about 2.0% w/w In another embodiment, the present invention is directed to a method of reducing crop load comprising applying an effective amount of a formulation of the present invention to a tree fruit, preferably an apple tree or a stone fruit tree.

In another embodiment, the present invention is directed to a method of enhancing grape coloration comprising co-applying an effective amount of a formulation of the present invention and S-abscisic acid to a grape plant, preferably a seedless table grape variety.

Solvents suitable for use in the present invention include, but are not limited to, water, propylene glycol and polyethylene glycol, dipropylene glycol, polypropylene glycol and butyl glycol. Preferred solvents include water, propylene glycol and polyethylene glycol. The polyethylene glycol is, preferably, polyethylene glycol 200. Solvents for use in the present invention may be present at a concentration from about 1% to about 99% w/w, preferably from about 50% to about 95% w/w and more preferably from about 70% to about 90% w/w. In a preferred embodiment, the solvent is water, more preferably at a concentration from about 70% to about 80% w/w. In another preferred embodiment, the solvent is propylene glycol, more preferably at a concentration from about 80% to about 90% w/w.

Surfactants suitable for use in aqueous formulations of the present invention include, but are not limited to, phosphate ester family surfactants, comprising mixtures of mono and di phosphate esters and having at least 5 degrees of ethoxylation including polyoxyethylene alkyl ether phosphate. Surfactants for use in aqueous formulations of the present invention may be present at a concentration from about 1% to about 10% w/w, preferably from about 1% to about 5% w/w. In a preferred embodiment, the aqueous formulation surfactant is polyoxyethylene alkyl ether phosphate, more preferably the polyoxyethylene alkyl ether has from 5 to 6 moles of ethoxylation. In another preferred embodiment, the polyoxyethylene alkyl ether phosphate is present at a concentration from about 1% to about 5% w/w, more preferably at about 2.5% w/w.

Surfactants suitable for use in non-aqueous but water miscible formulations of the present invention include, but are not limited to, polysorbate 20. Surfactants for use in non-aqueous formulations of the present invention may be present at a concentration from about 1% to about 10% w/w, preferably from about 1% to about 5% w/w. In a preferred embodiment of an aqueous formulation, the surfactant is polysorbate 20, more preferably present at a concentration from about 1% to about 5% w/w, even more preferably at about 2.0% w/w.

Preservatives suitable for use in formulations of the present invention include, but are not limited to, Kathon® CG/ICP (5-chloro-2-methyl-1,2-isothiazol-3-one/2-methyl-2H-isothiazol-3-one; Kathon is a registered trademark of Rohm and Haas Comp any and Kathon CG/ICP is available from Dow Chemicals), benzoates, potassium sorbate and combinations thereof.

Chelating agents suitable for use in formulations of the present invention include, but are not limited to, EDTA, EDTA salts, citrates, gluconates and combinations thereof.

In some embodiments, the compositions may include additional surfactants, crystal growth inhibitors, stickers, spreaders, leaf penetrants, dispersants, a systemic acquired resistance inducer, anti-foaming agents, preservatives, pH regulators, solubilization agents, a humectant, a dye, U.V. (ultra-violet) protectants, a vehicle or other components which facilitate production, storage stability, product handling application and biological efficacy.

The present invention provides very stable aqueous and non-aqueous formulations for foliar spray, drench, in-furrow and seed treatment applications.

Throughout the application, the singular forms "a," "an," and "the" include plural reference unless the context clearly dictates otherwise.

The term "effective amount" denotes an amount that is sufficient to provide the sought-after result.

As used herein, all numerical values relating to amounts, weight percentages and the like that are defined as "about" or "approximately" each particular value denotes the value plus or minus 10%. For example, the phrase "about 10% w/w" is to be understood as encompassing values from 9% to 11% w/w. Therefore, amounts within 10% of the claimed values are encompassed by the scope of the invention.

1 As used herein, the terms "with from 5 to 6 moles of ethoxylation" and "has from 5 to 6 moles of ethoxylation" each refer to a polyoxyethylene alkyl ether phosphate with a degree of ethoxylation of this exact range and not a polyoxyethylene alkyl ether phosphate with an overlapping range (i.e. polyoxyethylene alkyl ether phosphate with from 4 to 5 moles of ethoxylation).

These representative embodiments are in no way limiting and are described solely to illustrate some aspects of the invention.

The invention is demonstrated by following representative examples. The following examples are offered by way of illustration only and not by way of limitation.

EXAMPLES

Example 1. Titration of ACC HCl Salt Solutions

Method

When ACC HCl salt was added to water to a concentration of 10% w/w ACC the pH was determined to be 1.0±0.3. The solution was then titrated with each of sodium hydroxide, N,N dimethyl ethanolamine, triethanolamine, choline hydroxide, ammonium hydroxide dimethyl amine, and triethyl tetramine to achieve more basic solutions.

Results

Upon titration to achieve a more basic solution precipitates formed at a pH range of 2.75±0.3 to 8.5±0.3 for each of the bases. Further titration to a pH above 9.0 resulted in all precipitates dissolving into solution. Thus, ACC HCl salt solutions are inherently unstable at a pH range of 2.75 to 8.5.

Example 2. Screening of Surfactants to Prepare Stable ACC HCl Salt Solutions Method Surfactants were added to the ACC HCl salt solution of Example 1 at concentrations as shown in Table 1. The solution was then titrated with potassium hydroxide to achieve a more basic solution. Due to the exothermic nature of the titration process, titration occurred in a water bath maintained at a temperature of 20° C.±5° C.

TABLE 1

| Surfactant Screening | | |
|---|---|---|
| Surfactant | Conc. (w/w) | Precipitates Formed |
| Atlox ® 4913 (nonionic block copolymer) [Croda Inc.] | 1 to 2.5% | YES |
| Brij ® O20 (polyoxyethylene vegetable-based fatty ether derived from cetyl alcohol) [Croda Inc.] | 2.5% | YES |
| Crodateric ™ LIDP-LQ (sodium alkyliminodipropionate Croda Inc.] | 2.5% | YES |
| Multitrope ™ 1214 (polyoxyelerie alkyl ether phosphate with a degree of ethoxylation of 4 to 5 moles) [Croda Inc.] | 2.9% | YES |
| Tweed ® 20 (polysorbate 20) | 2.5% | YES |
| Brij ® O20 + Atlox ® 4913 | 2.5% 1 to 2.5% | YES |
| Crodafos ™ D4A (polyoxyethylene alkyl ether phosphate with a degree of ethoxylation of 5 to 6 moles) [Croda Inc.] | 1.0% | YES |
| Crodafos ™ D4A (polyoxyethylene alkyl ether phosphate with a degree of ethoxylation of 5 to 6 moles) | 2.5% | NO |
| Crodafos ™ D4A(polyoxyethylene alkyl ether phosphate with a degree of ethoxylation of 5 to 6 moles) | 5.0% | YES |

Result

Upon titration to achieve a more basic solution, precipitates formed at a pH range of 2.75±0.3 to 8.5±0.3 for each of the surfactants except, surprisingly, Crodafos™ D4A at 2.5% w/w. Further titration to a pH above 9.0 resulted in all precipitates dissolving into solution for each of the formulations. Thus, specific surfactants at specific concentrations can stabilize ACC HCl salt solutions. Further, it was determined that addition of ethylenediaminetetraacetic acid ("EDTA"), specifically EDTA tetrasodium salt dihydrate having CAS number 10378-23-1, at a concentration of about 0.5% w/w surprisingly further enhanced solution stability.

Example 3. Preparing Stable Non-Aqueous ACC HCl Salt Formulations

Method

A formulation was prepared containing 13.6% ACC HCl salt, 84.4% propylene glycol and 2% Tween® 20.

Result

Surprisingly, the high concentration of ACC HCl salt was soluble in these non-aqueous solvents. Further, non-aqueous formulations of the present invention remained stable when placed at 5° C. Thus, specific non-aqueous formulations can stabilize ACC HCl salt.

The following ACC HCl salt formulations of the present invention were subjected to bioefficacy studies:

Formula #1 (Formulation 1)

| | |
|---|---|
| 13.6% w/w | ACC HCl salt |
| 2.5% w/w | Crodafos ™ D4A |

-continued

| 4.95% w/w | Potassium hydroxide (45% w/w) |
| 0.1% w/w | Kathon ® CG/ICP |
| 0.5% w/w | EDTA |
| 78.35% w/w | water |
| 4.0 | pH |

Formula #2 (Formulation 2)

| 13.6% w/w | ACC HCl salt |
| 2.5% w/w | Crodafos ™ D4A |
| 6.26% w/w | Potassium hydroxide (45% w/w) |
| 0.1% w/w | Kathone ® CG/ICP |
| 0.5% w/w | EDTA |
| 77.04% w/w | water |
| 8.2 | pH |

Formula #3 (Formulation 3)

| 13.6% w/w | ACC HCl salt |
| 2.0% w/w | Tween ® 20 |
| 84.4% w/w | Propylene Glycol |

Example 4. Cotton Cotyledon Bioefficacy Assay

Method

As a part of the titration studies of ACC HCl salt (see Example 1, above), the effect of pH on ACC was determined. This was accomplished with solutions of either ACC HCl or ACC free acid titrated to appropriate pH's. Once prepared, solutions were amended with 0.05% (v/v) of a non-ionic surfactant and spray applied to the adaxial surface of 10-day old cotton cotyledons using a track sprayer. In addition to ACC-containing solutions, appropriate controls were tested. Two days (48 hours) after spray application, the cotyledons from each plant were removed, weighed and incubated in sealed glass vials for 4 to 7 hours. Headspace ethylene evolution by the cotyledons was measured by gas chromatography using standard methods.

TABLE 2

Effect of Solution pH and ACC form on Ethylene Production (nL/g FW/hr) by Cotton Cotyledons

| | Ethylene Production (nL/g FW*/hr) | |
| --- | --- | --- |
| Treatment | pH 2.5 | pH 5.0 |
| Control | 0.7 | 0.7 |
| 250 ppm ACC HCl | 26.9 | 16.5 |
| 250 ppm ACC free acid | 31.1 | 13.4 |

*FW: Fresh weight

Results

In Table 2, we show that pH has a significant effect on the ethylene-generating ability of ACC solutions and that this effect is independent of ACC form. An ACC HCl solution at pH 2.5 generated 65% more ethylene than the same solution at pH 5.0. This ethylene generating activity on pH was seen regardless of whether the ACC was the free acid or the HCl salt form.

Example 5. Cotton Cotyledon Bioefficacy Assay

Method

Formulations 1 and 2 (Example 3, above) were diluted with water to 500 ppm of ACC and were assayed as is shown in Example 4. The controls contained all excipients of the formulations and had a pH of 7.5. In contrast, the spray solutions of the formulations 1 and 2 were at pH 4.4 and 7.6, respectively. Forty-eight (48) hours after application, the cotyledons were removed and incubated in sealed vials for 4 to 7 hours. Following incubation, the cotyledons were measured for ethylene gas production by gas chromatography.

TABLE 3

Effect of ACC formulation application on ethylene production by cotton

| Treatment | Ethylene (nL C2H4/g FW/hr) |
| --- | --- |
| Control | 1.3 |
| Formulation 1, 500 ppm ACC | 70.3 |
| Formulation 2, 500 ppm ACC | 37.1 |

Results

As seen in Table 3, Spray applications of either formulation significantly increased ethylene production from cotton cotyledons. In this study the effect of solution pH is also dramatic: spray solution of formulation 1, with a pH of 4.4 produced nearly twice as much ethylene as the spray solution of formulation 2 (pH 7.6). This result confirms the role of solution pH as an important property in the bioefficacy of ACC generally and in particular the ACC HCl salt formulations as shown.

Example 6. Phytotoxicity Assay

Method

Formulations 1, 2 and 3 were diluted with water to 1000 ppm of ACC and a tank-mix non-ionic surfactant was added to an effective concentration of 0.5% (v/v). Dilution of the formulations in deionized water resulted in a slight decrease in pH. Spray solutions were applied to 12-day old cowpea plants at a spray rate to ensure complete coverage.

Results

No Phytotoxicity was observed on cowpea. Thus, ACC HCl salt formulations of the present invention are proved to be safe on plants.

Example 7. Apple Fruitlet Thinning Assay

Method

Formulations 1-3 were diluted with water to 408 ppm ACC HCl salt (i.e. molar equivalent to 300 ppm ACC free acid) and applied to Gala apple fruit when mean fruit diameter was 20 mm along with ACC free acid at 300 ppm. The apple plants were allowed to reach fruit set and set fruits were counted and compared to an untreated control. Fruit set was calculated as the number of fruits which set on a sample of 100 flower clusters.

TABLE 4

Effect of ACC formulation activity on apple thinning activity as measured by the number of fruit which set per 100 flower clusters.

| ACC formulation | Fruit set (fruit/100 flower clusters) |
|---|---|
| Control | 87 |
| ACC Free acid | 70 |
| Formulation 1 | 64 |
| Formulation 2 | 63 |
| Formulation 3 | 48 |

Result

As seen in Table 4, fruit set is reduced by about 30-45% formulations of the present invention, compared to a reduction of only 20% with the molar equivalent of the free acid form. Thinning after application by formulations 1-3 is better than thinning resulting from application of the aqueous solution of ACC free acid at the same molar concentration. Thus, ACC HCl salt formulations of the present invention are an improvement for achieving fruit thinning from the aqueous solution of ACC free acid.

Example 8. Red Grape Coloration Assay

Method

Formulations 1-3 and an aqueous solution of ACC free were each combined separately with ProTone® (20% S-abscisic acid, potassium salt) at a concentration of 200 ppm S-abscisic acid. An aqueous solution of ACC free acid was combined at a concentration of 200 ppm whereas Formulations 1-3 were combined at a concentration of 272 ppm, which is equivalent to 200 ppm free acid ACC on a molar basis. To each spray solution, a non-ionic spray adjuvant was added (Latron B-1956) at a final concentration of 0.05% (v/v). These formulations were then applied to vines of Flame Seedless variety red grapes at three different locations in California. The effect of Formulations on grape coloration is reported at the number of grape bunches on each vine that reached a commercially acceptable level of red color, expressed as a percent of the total number of bunches on each vine.

TABLE 5

Effect of ACC formulation activity on coloration of Flame Seedless table grapes. Data are expressed as the percent of marketable bunches meeting commercially acceptable color grade standards at the end of the season.

| ACC Formulation | Percent Marketable Bunches | | |
|---|---|---|---|
| | Location 1 | Location 2 | Location 3 |
| UTC | 39 | 20 | 42 |
| ProTone ® | 60 | 59 | 58 |
| ProTone ® + ACC Free acid | 78 | 52 | 75 |
| ProTone ® + Formulation 1 | 91 | 66 | 79 |
| ProTone ® + Formulation 2 | 83 | 65 | 75 |
| ProTone ® + Formulation 3 | 92 | 71 | 94 |

Result

As seen in Table 5, in combination with ProTone®, Formulas 1-3 resulted in increased coloration of marketable grape clusters (bunches) compared to untreated vines and compared to vines treated with ProTone@ only. Those vines treated with Formulations 1-3 were numerically equivalent or superior to vines treated with the aqueous solution of ACC free acid. Thus, the experimental ACC HCl salt formulations of the present invention were at least equivalent and often superior to the aqueous solution of ACC free acid. Formulation 3 was superior to the aqueous solution of ACC free acid and to Formulation 1 and Formulation 2 in all cases.

What is claimed is:

1. A liquid agricultural formulation consisting of 1-amino-I-cyclopropanecarboxylic acid hydrochloride salt (ACC HCl salt); propylene glycol and polysorbate 20.

2. A non-aqueous agricultural formulation consisting of:
about 5% to about 20% w/w 1-amino-1-cyclopropanecarboxylic acid hydrochloride salt (ACC HCl salt);
about 60% to about 90% propylene glycol; and about 1% to about 5% w/w polysorbate 20, wherein w/w denotes weight by weight of the formulation.

3. A non-aqueous agricultural formulation consisting of:
1-amino-1-cyclopropanecarboxylic acid hydrochloride salt (ACC HCl salt) at a concentration of about 13.6% w/w;
propylene glycol at a concentration of about 84% w/w; and polysorbate 20 at a concentration of about 2.0% w/w, wherein w/w denotes weight by weight of the formulation.

* * * * *